United States Patent
Ikeda et al.

(10) Patent No.: US 7,694,706 B2
(45) Date of Patent: Apr. 13, 2010

(54) TIRE WHEEL ASSEMBLY

(75) Inventors: Toshiyuki Ikeda, Hiratsuka (JP); Atsushi Tanno, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 949 days.

(21) Appl. No.: 10/583,930

(22) PCT Filed: Jan. 19, 2005

(86) PCT No.: PCT/JP2005/000562

§ 371 (c)(1), (2), (4) Date: Jun. 20, 2006

(87) PCT Pub. No.: WO2005/068223

PCT Pub. Date: Jul. 28, 2005

(65) Prior Publication Data

US 2009/0151836 A1 Jun. 18, 2009

(30) Foreign Application Priority Data

Jan. 20, 2004 (JP) .............................. 2004-011603

(51) Int. Cl.
- B60C 5/00 (2006.01)
- B60C 19/00 (2006.01)
- B60B 21/00 (2006.01)
- B60B 21/12 (2006.01)

(52) U.S. Cl. .................. 152/331.1; 152/450; 301/6.91; 301/5.1

(58) Field of Classification Search ............... 152/450, 152/331.1; 301/6.91, 5.1
See application file for complete search history.

(56) References Cited

U.S. PATENT DOCUMENTS

| | | | |
|---|---|---|---|
| 5,891,278 A | 4/1999 | Rivin | |
| 6,309,026 B1 | 10/2001 | Svedhem | |
| 6,516,849 B2 * | 2/2003 | Flament et al. | |

FOREIGN PATENT DOCUMENTS

| | | |
|---|---|---|
| DE | 199 20 681 A1 * | 11/2000 |
| EP | 0 965 977 A2 * | 12/1999 |
| JP | 64-001601 | 1/1989 |
| JP | 3-1805 | 1/1991 |
| JP | 7-266802 | 10/1995 |
| JP | 2001-113902 | 4/2001 |
| JP | 2004-330862 | 11/2004 |
| WO | WO-02/087904 A1 * | 11/2002 |

OTHER PUBLICATIONS

English machine translation of DE 199 20 681 A1, Nov. 9, 2000, already of record.*

* cited by examiner

*Primary Examiner*—Adrienne C Johnstone
(74) *Attorney, Agent, or Firm*—Greer, Burns & Crain, Ltd.

(57) ABSTRACT

Provided is a tire wheel assembly making it possible to effectively reduce cavity resonance noise without causing either negative influence on deformation of a tire or deterioration in rim assembling workability. A tire wheel assembly of the present invention includes a pneumatic tire, and a wheel provided with a rim fitted with the pneumatic tire, and forms a cavity portion between the pneumatic tire and the rim. The tire wheel assembly comprises at least one tube, which has one end thereof closed while having a length of 55% to 110% of a reference length $L_0$ corresponding to one fourth of a cavity resonance wavelength, is provided so as to open to the cavity portion.

7 Claims, 7 Drawing Sheets

TIRE WHEEL ASSEMBLY

TECHNICAL FIELD

The present invention relates to a tire wheel assembly including a pneumatic tire and a wheel. More specifically, the present invention relates to a tire wheel assembly configured to effectively reduce cavity resonance noise.

BACKGROUND ART

As one of causes which generate noise in a pneumatic tire, there is cavity resonance noise due to air with which an inside of the tire is filled. This cavity resonance noise is generated due to vibration of air inside the tire, the vibration being caused by vibration of a tread portion because the tread portion vibrates due to irregularities of a road surface.

As a method of reducing noise caused by a cavity resonance phenomenon as described above, there has been proposed one where a time period during which resonance occurs at the same resonance frequency is reduced by changing, along a circumferential direction of the tire, in a cross-sectional area of a closed space formed with a tire and a wheel (for example, refer to Patent Document 1). More specifically, in order to change the cross-sectional area of the closed space, a bulkhead having a predetermined volume is installed onto an inner surface of the tire, or onto an outer peripheral surface of a rim.

In the abovementioned method, however, if a change in cross-sectional area of the closed space is made large for the purpose of increasing an effect in cavity resonance noise reduction, the bulkhead interferes with deformation of the tire in some cases, and rim assembling workability is deteriorated in some cases. Therefore, a size of the bulkhead is restricted, and it is difficult to increase the effect in cavity resonance noise reduction.

[Patent Document 1] Japanese patent application Kokai publication No. 2001-113902

DISCLOSURE OF THE INVENTION

An object of the present invention relates to a tire wheel assembly making it possible to effectively reduce cavity resonance noise without causing either negative influence on deformation of a tire or deterioration in rim assembling workability.

A tire wheel assembly of the present invention for achieving the above object is one which includes a pneumatic tire, and a wheel provided with a rim fitted with the pneumatic tire, and forms a cavity portion between the pneumatic tire and the rim. The tire wheel assembly is characterized in that at least one tube, which has one end thereof closed while having a length of 55% to 110% (preferably, 85% to 105%) of a reference length $L_0$ corresponding to one fourth of a cavity resonance wavelength, is provided so as to open to the cavity portion.

Furthermore, a tire wheel assembly of the present invention is one which includes a pneumatic tire, and a wheel provided with a rim fitted with the pneumatic tire, and forms a cavity portion between the pneumatic tire and the rim. The tire wheel assembly is characterized in that a plurality of tubes, each of which has one end thereof closed while having a length of 55% to 110% (preferably, 85% to 105%) of a reference length $L_0$ corresponding to one fourth of a cavity resonance wavelength, are provided so as to open to the cavity portion; and that opening portions of these tubes are arranged in one arbitrary location on a circumference, or in two locations facing each other across a rotational axis of the tire.

As a result of intensively and extensively working on and researching cavity resonance of a pneumatic tire, the inventors of the present invention obtained knowledge that, when a tube communicating with a cavity portion formed between the pneumatic tire and a rim is provided, a resonance frequency is split because of mutual interference between vibration of air inside the tube and vibration of air inside the cavity portion. In particular, they found out that a one-end closed tube having a length of about one fourth of a cavity resonance wavelength causes a split in resonance frequency, and elicits changes in resonance frequency which are associated with rotation, despite the length shorter than the cavity resonance wavelength. With these findings, unlike in the case of reducing cavity resonance noise simply based on a change in cross-sectional area of the closed space as in the conventional manner, cavity resonance noise can be effectively reduced without causing either negative influence on deformation of the tire or deterioration in rim assembling workability.

The cavity resonance wavelength ($\lambda$) is an average circumferential length of a cavity portion formed between a pneumatic tire and a rim. The reference length $L_0$ (mm) corresponding to one fourth of this cavity resonance wavelength can be calculated, based on the following equation (1), from a tire size.

$$L_0 = \alpha \cdot A \cdot B + \beta \cdot C, \tag{1}$$

where A, B, C, $\alpha$ (constant), and $\beta$ (constant) denote a nominal cross-sectional width, a nominal aspect ratio, a nominal rim diameter, $8.33 \times 10^{-3}$, and $1.78 \times 10^{1}$, respectively.

For example, when the tire size is 215/60R16, A=215, B=60 and C=16 are given, whereby $L_0$=392 mm is obtained. That is, the above equation (1) is an equation for easily calculating, from the tire size, the reference length $L_0$ (mm) corresponding to one fourth of the cavity resonance wavelength.

In the present invention, although it is required to provide at least one tube so as to open to the cavity portion, an effect in cavity resonance noise reduction can be enhanced if a plurality of tubes are provided so as to open to the cavity portion; and the opening portions of these tubes are arranged in one arbitrary location on a circumference, or in two locations facing each other across the rotational axis of the tire. At this point, it is desirable that an angle with respect to the rotational axis of the tire, which defines a range of each of the locations where the opening portions of the tubes are arranged, be equal to or less than 35 degrees. By thus defining a range of the angle for the locations where the opening portions of the tubes are arranged, the split in resonance frequency becomes more conspicuous.

It is preferable that a cross-sectional area of each of the tubes be set at 0.2% to 10% of a cross-sectional area of the cavity portion. Additionally, it is preferable that an inside of the tube be filled with any one of a porous material and a non-woven fabric which have air permeability. These porous material and non-woven fabric themselves have a sound absorbing effect, and furthermore, do not disturb the split in resonance frequency. The tubes may be provided with the pneumatic tire and/or the wheel.

BEST MODE FOR CARRYING OUT THE INVENTION

Hereinbelow, detailed descriptions will be given of configurations of the present invention with reference to the accompanying drawings.

Figure 1:
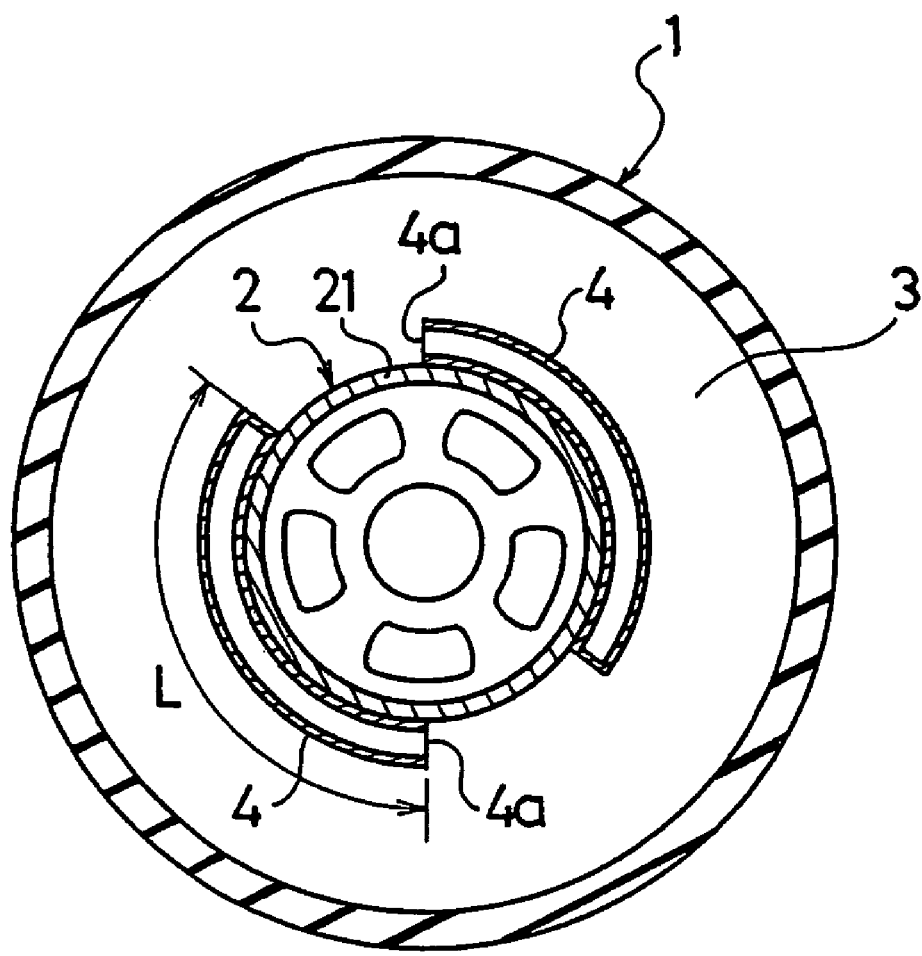
FIG. 1 is an equatorial cross-sectional view schematically showing a tire wheel assembly of the present invention.

FIG. 1 schematically shows a tire wheel assembly of the present invention. In FIG. 1, reference numeral 1 denotes a pneumatic tire; and 2, a wheel. This wheel 2 is provided with a rim 21 fitted with the pneumatic tire 1. Additionally, a cavity portion 3 is formed between the pneumatic tire 1 and the rim 21 of the wheel 2. Moreover, in this tire wheel assembly, two tubes 4, 4 are formed so as to open to the cavity portion 3.

Each of the tubes 4 has one end thereof closed while having a length L approximated to the reference length $L_0$ corresponding to one fourth of a cavity resonance wavelength $\lambda$. Opening portions 4a of these tubes 4 are arranged in one arbitrary location on a circumference, or in two locations facing each other across a rotational axis of the tire.

Figure 2A:
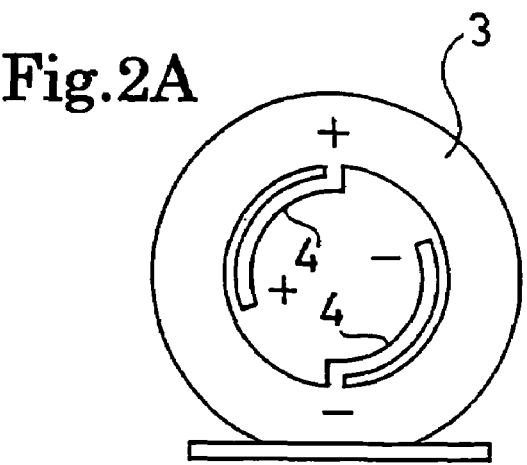
FIGS. 2A, 2B, and 2D are illustrations showing states of resonance in the present invention.
Figure 2B:
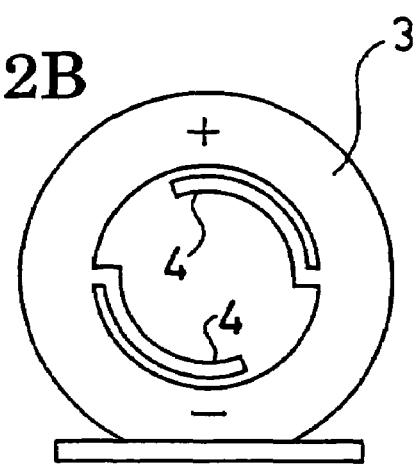
Figure 2D:
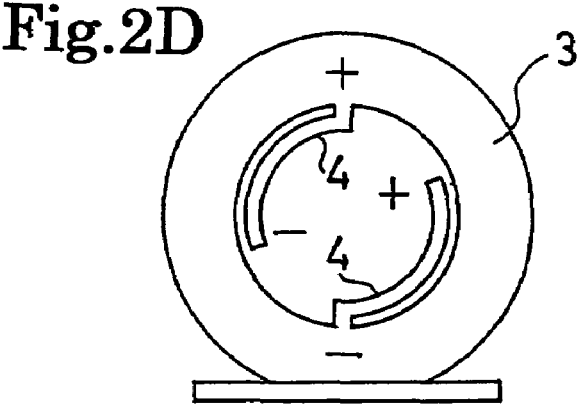

In the tire wheel assembly configured as described above, vibration inside the cavity portion 3 and vibration inside the tubes 4 interfere with each other, and additionally, the interference changes depending on the positions of the opening portions of the tubes 4. Therefore, as a result, three states of resonance shown in FIGS. 2A, 2B, and 2D come to exist during rotation. In each of the drawings, "+" and "−" indicate antinode locations where amplitudes of sound pressure are large, and a difference in sign indicates being in mutually opposite phases. In FIG. 2B where the opening portions of the tubes 4 are located at positions 90 degrees away from the ground position, the opening positions thereof are located at nodes of the sound pressure of the cavity portion 3. Therefore, vibration in the cavity portion 3 does not suffer interference from the tubes 4, and a resonance frequency becomes fb substantially equal to a resonance frequency of a case without the tubes 4. At the times of FIGS. 2A and 2D where the respective opening portions of the tubes 4 are located at the ground position and at a position diametrically opposed thereto, vibration in the cavity portion 3 and vibration in the tubes 4 interfere with each other, and the resonance frequency changes. In FIG. 2A, vibration inside the tubes 4 becomes in same phase with vibration inside the cavity portion 3 and acts so as to reduce the resonance frequency, whereby the resonance frequency changes into fa lower than fb. In FIG. 2D, vibration inside the tubes 4 becomes in opposite phase with vibration inside the cavity portion 3, and acts so as to increase the resonance frequency, whereby the resonance frequency changes into fd higher than fb. That is, when the respective opening portions of the tubes 4 are located at the ground position and at the position diametrically opposed thereto, two resonance states fa and fd are held.

Figure 3:
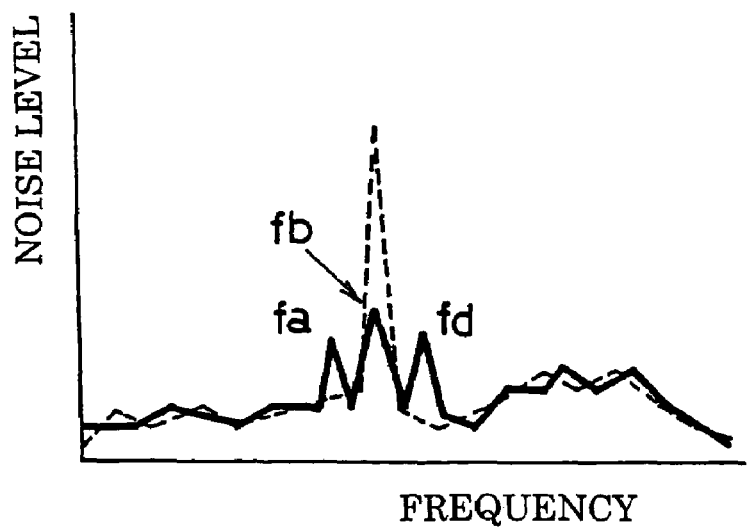
FIG. 3 is a graph showing a relation between a noise level and a frequency in the present invention.

When positions of the opening portions of the tubes 4 thus change along with rotation, the resonance frequency repeatedly changes from fb to fa, and then to fd, and furthermore, to fb. Accordingly, it becomes impossible for cavity resonance to continue, whereby cavity resonance noise can be reduced. In particular, since the resonance frequency is split into three and a split width (a difference between fa and fd) becomes large as shown in FIG. 3, noise levels at the respective resonance frequencies become smaller, whereby an improvement effect in terms of feeling becomes larger.

Figure 4:
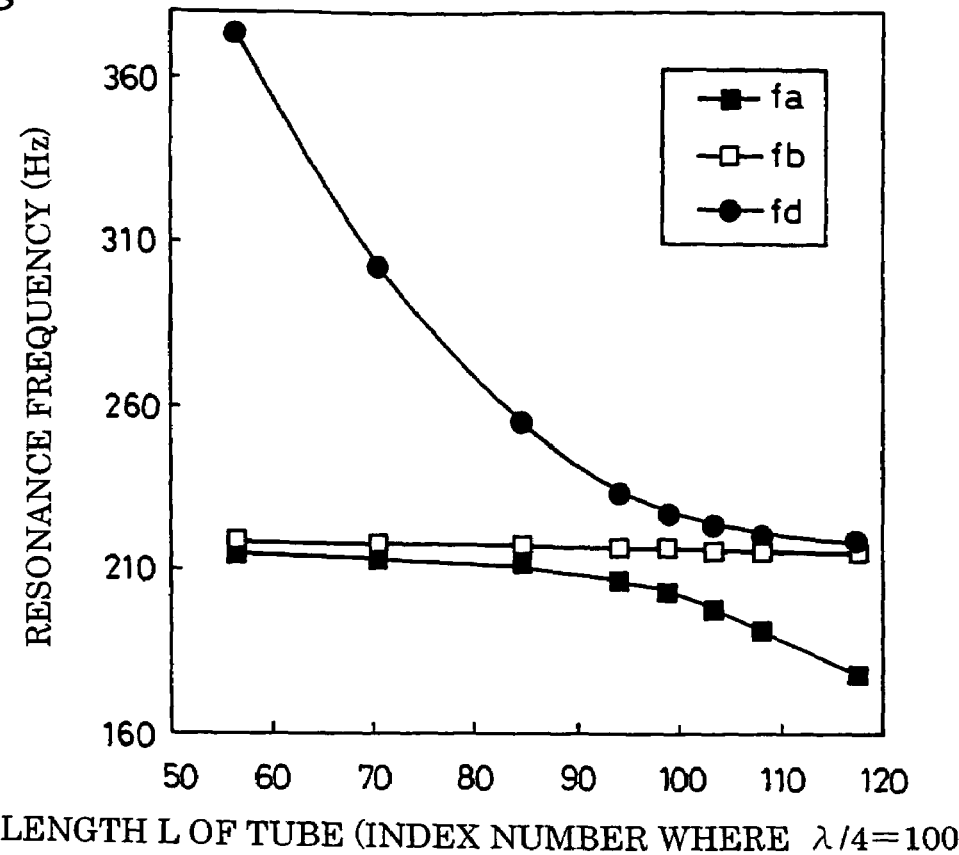
FIG. 4 is a graph showing a relation between a resonance frequency and a length L of a tube in the present invention.
Figure 5:
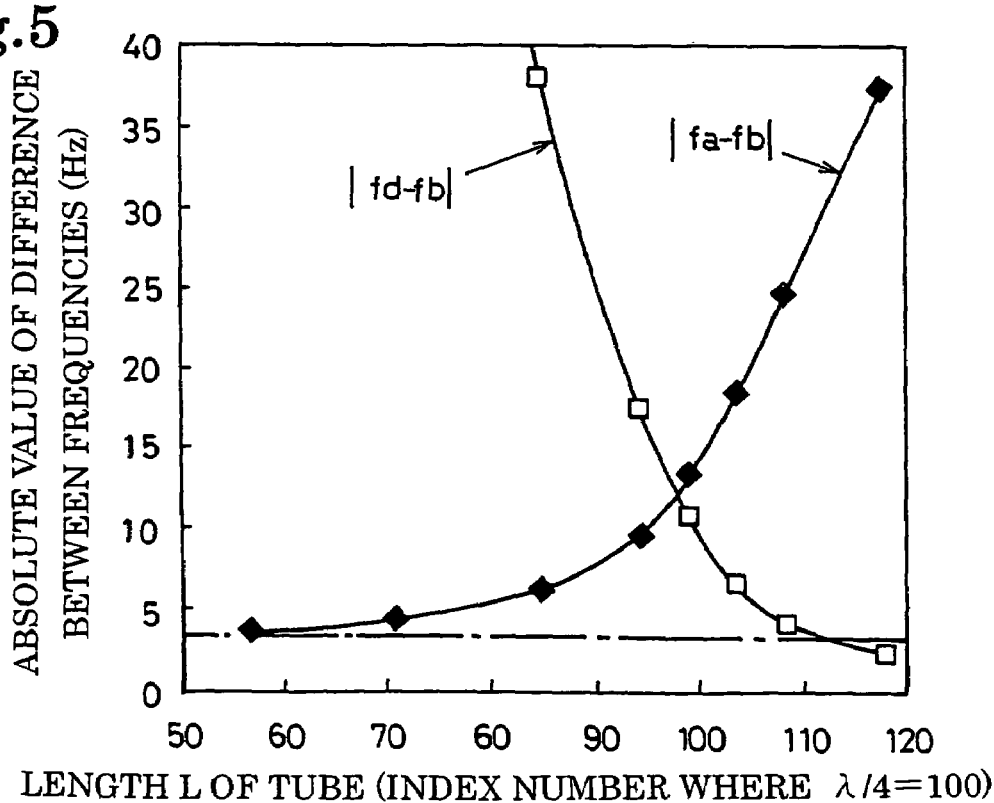
FIG. 5 is a graph showing a relation between an absolute value of a difference between resonance frequencies, and the length L of the tube in the present invention.

Here, a description will be given of a result of having provided two tubes, which had the same length and the same cross-sectional area, in a well portion of the wheel, so as to open to the cavity portion, having arranged opening portions of these tubes in two locations which face each other across the rotational axis of the tire (180 degree facing position), and then having measured resonance frequencies while changing a length L of each of the tubes. FIG. 4 shows a relation between the resonance frequency and the length L of the tube. On the other hand, FIG. 5 shows a relation between an absolute value of a difference between resonance frequencies, and the length L of the tube. Note that the tube length L is expressed in a form of index number where 100 is given to the reference length $L_0$ ($\lambda/4$).

As shown in FIGS. 4 and 5, it can be found that, when the tube length L is in a range between 55% and 110% of the reference length $L_0$, the absolute value of the difference between resonance frequencies obtained by the split becomes sufficiently large. It can be found that, particularly when the tube length L is in a range between 85% and 105% of the reference length $L_0$, there is a larger effect. Incidentally, if the opening portions of the tubes are closed, it becomes a factor in causing variations along a circumferential direction of the tire in cross-sectional area of the cavity portion. Referring to FIG. 5, an alternate long and short dashed line indicates measured values for a case where the resonance frequency was split based on changes in cross-sectional area which can be caused with the closed tube. From these results, it can be found that an effect in cavity resonance noise reduction based on the interference action from the tubes is far larger than an effect in cavity resonance noise reduction based on the changes in cross-sectional area.

In the present invention, it is effective to enhance the effect in the split in resonance frequency by increasing the cross-sectional area of the tube. Here, it is preferable if the cross-sectional area of the tube in an equatorial cross-section of the tire is set at 0.2% to 10% of a cross-sectional area of the cavity portion in the equatorial cross-section of the tire. That is, it is desirable that the cross-sectional area of the tube is equal to or more than 0.2% for the purpose of exerting the effect in the split in resonance frequency, and it is desirable that the cross-sectional area of the tube is equal to or less than 10% in view of not disturbing rim assembling workability.

Figure 6:
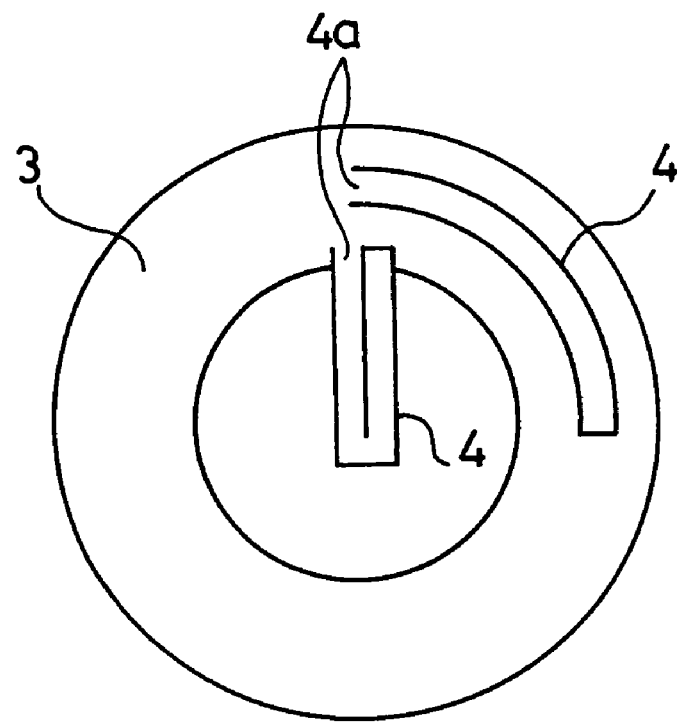
FIG. 6 is an illustration schematically showing a structure where, in the tire wheel assembly of the present invention, opening portions of a plurality of tubes are set to open to one arbitrary location on a circumference.
Figure 7:
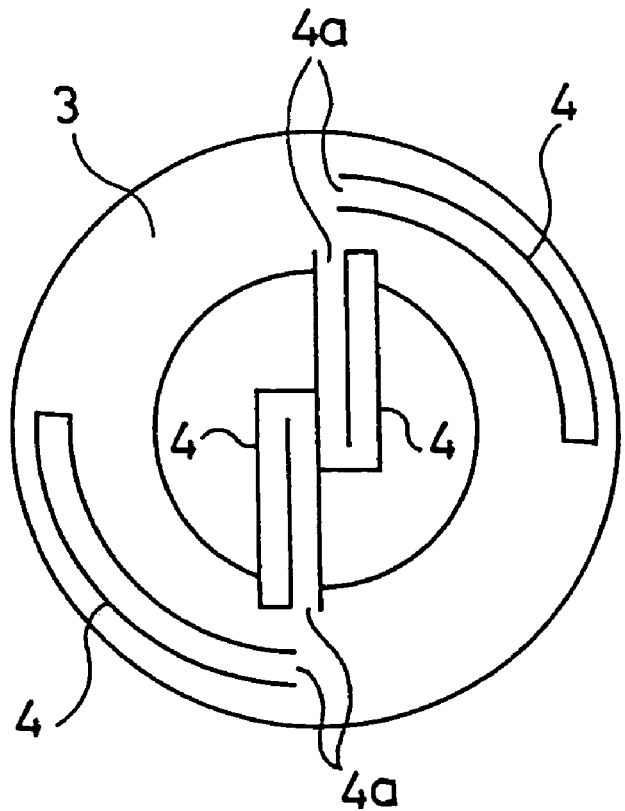
FIG. 7 is an illustration schematically showing a structure where, in the tire wheel assembly of the present invention, opening portions of a plurality of tubes are set to open to two locations facing each other across a rotational axis of a tire.

On the other hand, it is also possible to increase a total of the cross-sectional areas of the tubes by increasing a number of the tubes, but in that case, positions of the opening portions thereof are important. FIG. 6 schematically shows a structure where the opening portions of the plural tubes are set to open to one arbitrary location on a circumference. FIG. 7 schematically shows a structure where the opening portions of the plural tubes are set to open to each of two locations facing each other across a rotational axis of a tire. As shown in these FIGS. 6 and 7, in the case of providing the plural tubes 4, it is desirable that the opening portions 4a thereof are arranged in one arbitrary location on a circumference, or two locations facing each other across the rotational axis of the tire.

Figure 8:
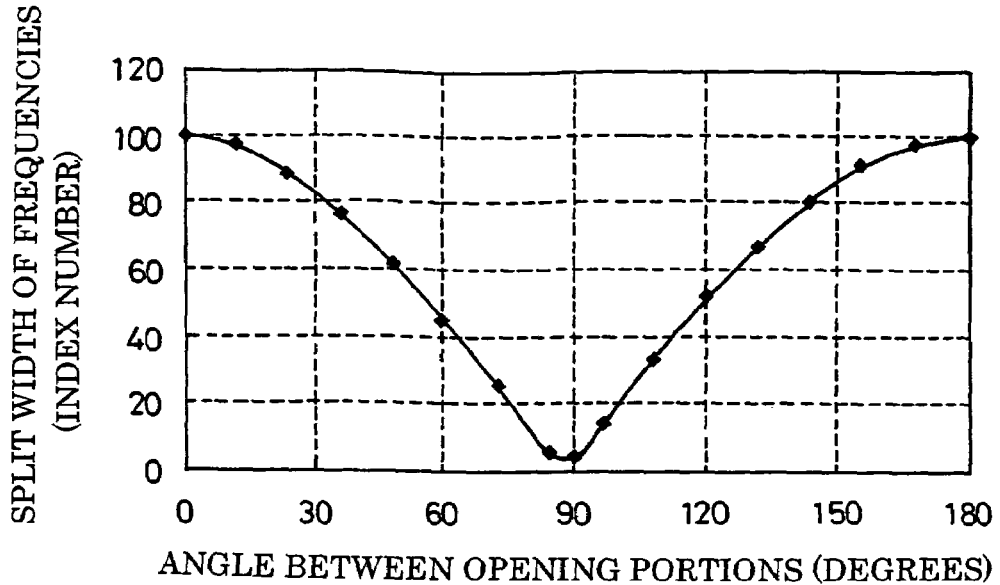
FIG. 8 is a graph showing a relation between a relative angle with respect to the rotational axis of the tire between the opening portions, and a split width of resonance frequencies, in the present invention.

Here, a description will be given of a result of having provided two tubes, which had the same length and the same cross-sectional area, in a well portion of the wheel, so as to open to the cavity portion, and then having measured split widths between resonance frequencies while changing relative positions of the opening potions of these tubes. FIG. 8 shows a relation between a relative angle of the opening portions with respect to the rotational axis of the tire, and a split width of resonance frequencies. Note that the spilt width of resonance frequencies is expressed in a form of index number where 100 is given to a case where positions of the opening portions of the two tubes meet with each other (0 degree).

Figure 9:
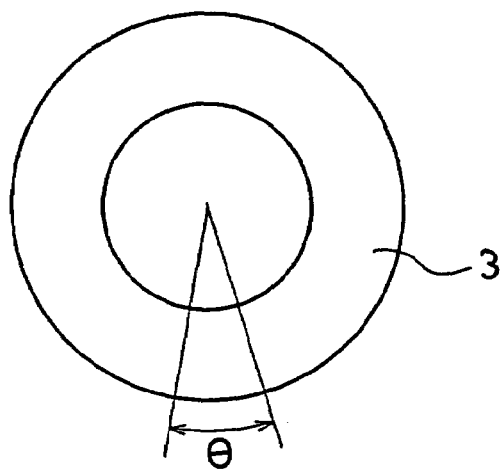
FIG. 9 is an illustration showing a location (one location) where the opening portions of the tubes are arranged in the present invention.
Figure 10:
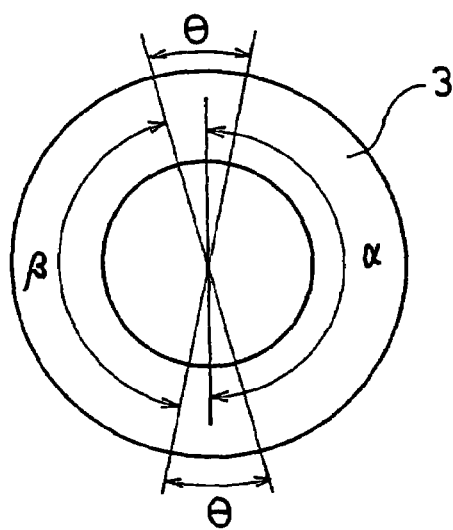
FIG. 10 is an illustration showing locations (two locations) where the opening portions of the tubes are arranged in the present invention.

As shown in FIG. 8, the effect in the split in resonance frequency becomes the largest when an angle between the opening portions with respect to the rotational axis of the tire is 0 degree or 180 degrees, and the split width of resonance frequencies becomes equal to or more than 80% of the largest value for the split width thereof particularly when the above angle is in a range between 0 and 35 degrees or between 145 and 180 degrees. Accordingly, in the case of arranging the opening portions of the plural tubes in one arbitrary location in a circumferential direction of the tire, it is preferable if an angle θ defining a range of the location is equal to or less than 35 degrees as shown in FIG. 9. On the other hand, in the case of arranging the opening portions of the plural tubes in two locations which face each other across the rotational axis of the tire, it is preferable if centers of the two respective locations are arranged so as to face each other at an angle α which is 180 degrees, and the angle θ defining a range of each of the locations is equal to or less than 35 degrees as shown in FIG. 10. That is, the two locations where the opening portions of the tubes are arranged are separated with each other at an angle β which is equal to or more than 145 degrees.

Figure 11:
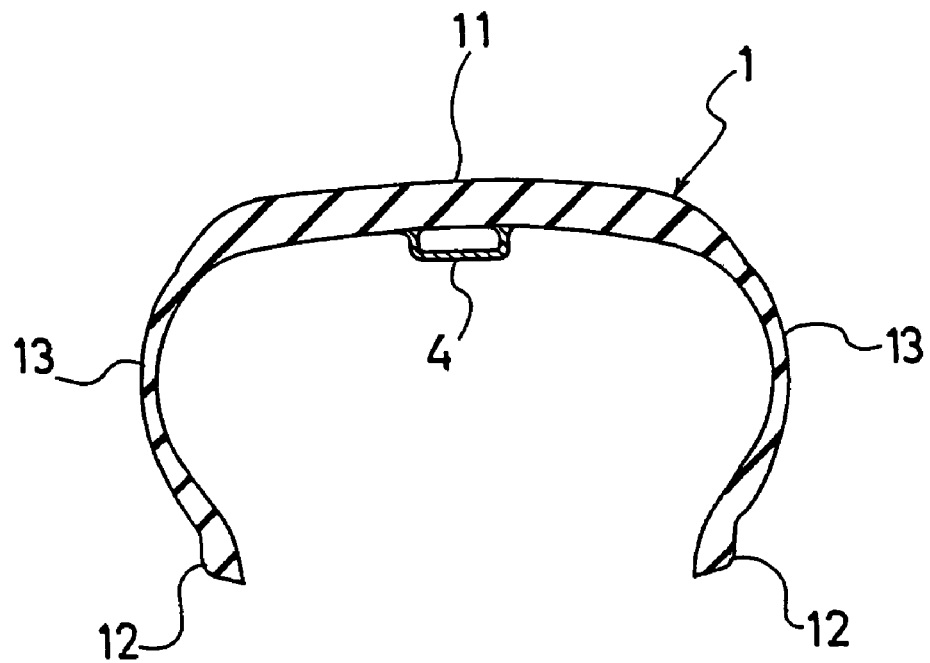
FIG. 11 is a meridian cross-sectional view showing an example of a pneumatic tire provided with the tube in the present invention.

FIG. 11 shows an example of the pneumatic tire provided with the tube. In FIG. 11, the pneumatic tire 1 is provided with a tread portion 11, a pair of left and right bead portions 12, and side wall portions 13 connecting the tread portion 11 and the respective bead portions 12. Additionally, on an inner surface of the tread portion 11, the one-end closed tube 4 is formed so as to extend in a circumferential direction of the tire.

Figure 12:
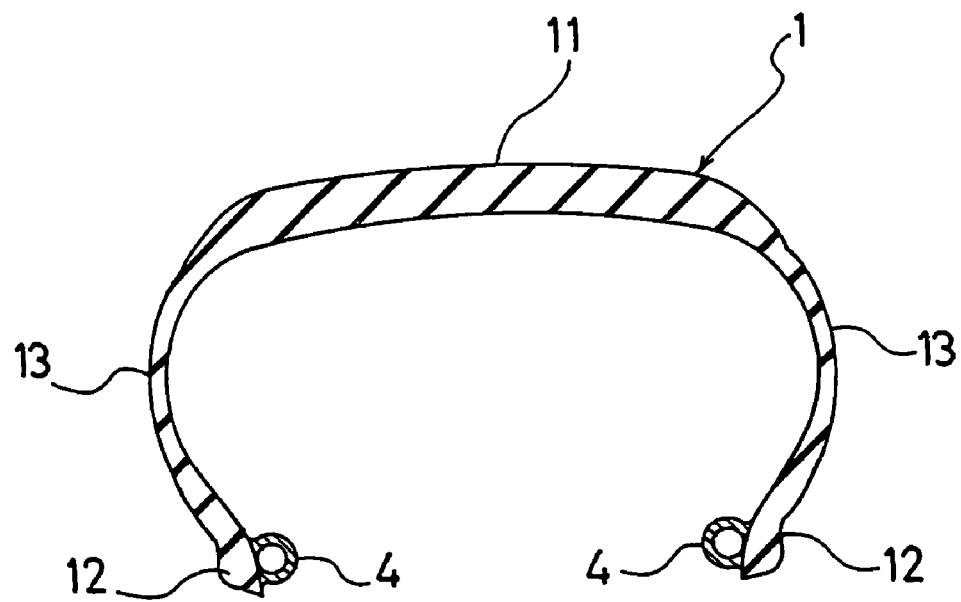
FIG. 12 is a meridian cross-sectional view showing another example of the pneumatic tire provided with the tube in the present invention.

FIG. 12 shows another example of the pneumatic tire provided with the tube. In FIG. 12, on inner surfaces of the respective bead portions 12, the one-end closed tubes 4 are formed so as to extend in the circumferential direction of the tire.

Figure 13:
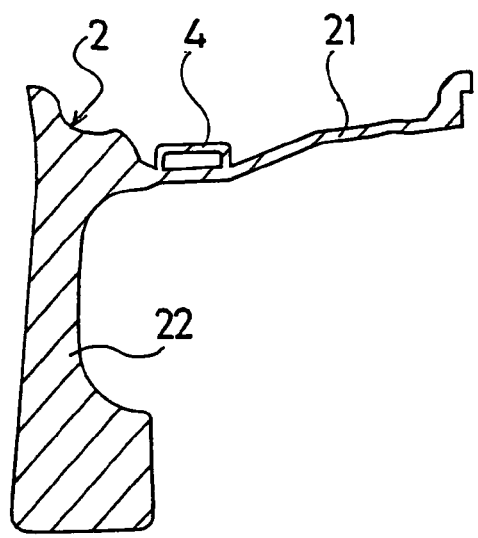
FIG. 13 is a meridian cross-sectional view showing an example of a wheel provided with the tube in the present invention.

FIG. 13 shows an example of the wheel provided with the tube. In FIG. 13, the wheel 2 is provided with the rim 21 and a spoke portion 22, the rim 21 being fitted with bead portions of a pneumatic tire, and the spoke portion 22 linking the rim 21 with an unillustrated axel. Additionally, on an outer peripheral surface of the rim 21, the one-end closed tube 4 is formed so as to extend in the circumferential direction of the rim.

Figure 14:
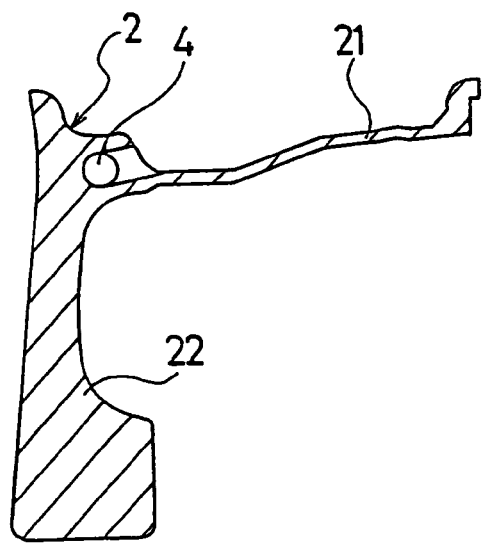
FIG. 14 is a meridian cross-sectional view showing another example of the wheel provided with the tube in the present invention.

FIG. 14 shows another example of the wheel provided with the tube. In FIG. 14, in a portion where the rim 21 and the spoke portion 22 are joined to each other, the one-end closed tube 4 is formed so as to extend in the circumferential direction of the rim. This tube 4 is allowed to communicate, on the outer peripheral surface of the rim 21, with the cavity portion inside the tire.

Figure 15:
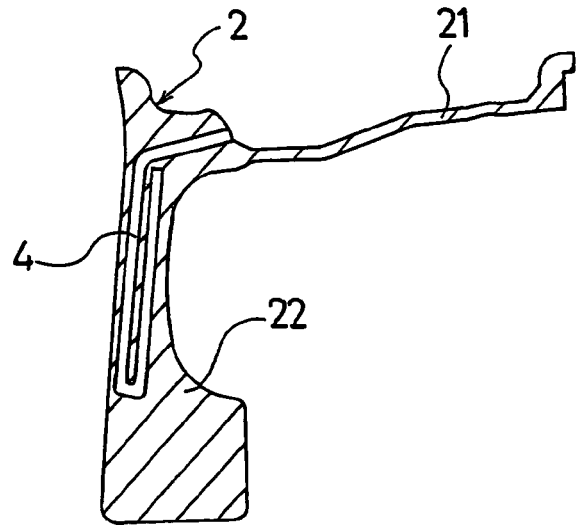
FIG. 15 is a meridian cross-sectional view showing still another example of the wheel provided with the tube in the present invention.

FIG. 15 shows still another example of the wheel provided with the tube. In FIG. 15, in the rim 21 and the spoke portion 22, the one-end closed tube 4 is formed so as to extend in a diametrical direction of the rim. This tube 4 has a folded back structure in order to secure a sufficient length thereof, and is allowed to communicate, on the outer peripheral surface of the rim 21, with the cavity portion inside the tire.

In FIGS. 11 to 15, as a material forming the tube 4, it is appropriate to use one, such as resin or metal, having no air permeability. Additionally, the length of the tube 4 may be configured to be variable, and thereby to be adjustable according to need. It is preferable if an inside of the tube 4 is filled with any one of a porous material and a non-woven fabric which have air permeability. As the porous material, there can be cited urethane foam having open cells, and the like. As the non-woven fabric, there can be cited glass wool, and the like. These porous material and non-woven fabric themselves have a sound absorbing effect, and furthermore, do not disturb the split in resonance frequency. Incidentally, if a material having inferior air permeability is used, the cross-sectional area of the tube 4 as a permeable path becomes substantially smaller, and the interference action thereof is reduced. Although the highest sound absorbing effect is expected when the entirety of the tube 4 is filled with any one of the porous material and the non-woven fabric, it is the most effective to arrange any one of them in the vicinity of the opening portion of the tube in a case of filling a part of the tube 4.

While the detailed descriptions have been given of the preferred embodiments of the present invention hereinabove, it should be understood that various modifications to, substitutions for, and replacements with the preferred embodiments can be carried out as long as the modifications, the substitutions, and the replacements do not depart from the spirit and the scope of the present invention defined by the attached scope of claim.

What is claimed is:

1. A tire wheel assembly, which includes a pneumatic tire having a pair of left and right bead portions, and a wheel provided with a rim fitted with the pneumatic tire, and forms a cavity portion between the pneumatic tire and the rim, wherein:

a plurality of tubes, each of which has one end thereof closed while having a length of 55% to 110% of a reference length L0 equal to one fourth of a cavity resonance wavelength, are provided so as to open to the cavity portion; and the plurality of tubes are two pairs of tubes whose opening portions are arranged in two locations facing each other across a rotational axis of the tire with each pair's opening portions arranged in one arbitrary location on a circumference, each pair having one of the tubes formed on the inner surface of a bead portion of the tire so as to extend in the circumferential direction of the tire and the other of the tubes provided with the wheel, an angle of equal to or less than 35 degrees with respect to the rotational axis of the tire defining a range of each of the locations on a circumference where the opening portions of one of the pairs of tubes are arranged.

2. The tire wheel assembly according to claim 1, wherein the length of each tube is set at 85% to 105% of the reference length L0.

3. The tire wheel assembly according to claim 1, wherein a cross-sectional area of each tube is set at 0.2% to 10% of a cross-sectional area of the cavity portion.

4. The tire wheel assembly according to claim 1, wherein an inside of each tube is filled with any one of a porous material and a non-woven fabric which have air permeability.

5. The tire wheel assembly according to claim 1, wherein the other of the tubes provided with the wheel is formed on an outer peripheral surface of the rim so as to extend in the circumferential direction of the rim.

6. The fire wheel assembly according to claim 1, wherein the wheel is provided with a spoke portion joined to the rim, and the other of the tubes provided with the wheel is formed in the portion joining the spoke portion to the rim so as to extend in the circumferential direction of the rim and to communicate with the cavity portion through the outer peripheral surface of the rim.

7. The tire wheel assembly according to claim 1, wherein the wheel is provided with a spoke portion joined to the rim, and the other of the tubes provided with the wheel is formed in the spoke portion so as to extend in a diametrical direction of the rim, in a folded back structure if necessary to secure a sufficient length thereof, and to communicate with the cavity portion through the outer peripheral surface of the rim.

* * * * *